US007933676B2

(12) United States Patent
Schuster

(10) Patent No.: US 7,933,676 B2
(45) Date of Patent: Apr. 26, 2011

(54) AUTOMATION SYSTEM WITH INTEGRATED SAFE AND STANDARD CONTROL FUNCTIONALITY

(75) Inventor: George K. Schuster, Royal Oak, MI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/239,948

(22) Filed: Sep. 30, 2005

(65) Prior Publication Data

US 2007/0168077 A1 Jul. 19, 2007

(51) Int. Cl.
*G06F 19/00* (2006.01)
*G05B 11/01* (2006.01)
*G08B 1/00* (2006.01)
*G08B 13/00* (2006.01)

(52) U.S. Cl. ........... 700/170; 700/21; 340/532; 340/541

(58) Field of Classification Search ............... 700/2, 18, 700/21, 79, 81, 65–66, 83; 340/500, 532, 340/539.22, 541
See application file for complete search history.

(56) References Cited

U.S. PATENT DOCUMENTS

| | | | | |
|---|---|---|---|---|
| 4,266,221 A * | 5/1981 | Hawkins | | 340/679 |
| 4,364,764 A * | 12/1982 | Farkas et al. | | 65/29.1 |
| 5,264,834 A * | 11/1993 | Silken et al. | | 340/679 |
| 5,574,437 A * | 11/1996 | Schwinn et al. | | 340/679 |
| 5,880,954 A * | 3/1999 | Thomson et al. | | 700/79 |
| 6,029,578 A * | 2/2000 | Weil et al. | | 101/494 |
| 6,683,432 B2 * | 1/2004 | Griffis | | 318/568.16 |
| 6,778,079 B2 * | 8/2004 | Weber | | 340/500 |
| 6,778,867 B1 * | 8/2004 | Ziegler et al. | | 700/79 |
| 6,856,862 B1 * | 2/2005 | Feltner | | 700/245 |
| 6,937,450 B1 * | 8/2005 | Mayer et al. | | 361/42 |
| 6,979,813 B2 * | 12/2005 | Avril | | 250/221 |
| 7,050,860 B2 * | 5/2006 | Muneta et al. | | 700/3 |
| 7,103,422 B2 * | 9/2006 | Takeuchi et al. | | 700/21 |
| 7,119,704 B2 * | 10/2006 | Grzan et al. | | 340/665 |
| 2002/0170399 A1 * | 11/2002 | Gass et al. | | 83/62.1 |
| 2003/0046382 A1 * | 3/2003 | Nick | | 709/224 |
| 2003/0050735 A1 | 3/2003 | Griffis | | |
| 2004/0148039 A1 * | 7/2004 | Farchmin et al. | | 700/79 |
| 2004/0182574 A1 | 9/2004 | Adnan et al. | | |
| 2005/0010332 A1 * | 1/2005 | Abe et al. | | 700/245 |
| 2005/0063114 A1 * | 3/2005 | Suhara et al. | | 361/62 |
| 2005/0109134 A1 * | 5/2005 | Barnett et al. | | 74/3 |
| 2006/0038696 A1 * | 2/2006 | Arcaria et al. | | 340/691.3 |

FOREIGN PATENT DOCUMENTS

EP 1521148 4/2005

OTHER PUBLICATIONS

Hasubek, Bodo, European Search Report, Nov. 3, 2009, European Patent Office, Munich, Germany.

* cited by examiner

*Primary Examiner* — Ramesh B Patel
*Assistant Examiner* — Darrin Dunn
(74) *Attorney, Agent, or Firm* — Boyle Frederickson LLP; R. Scott Speroff; John M. Miller

(57) ABSTRACT

An industrial control system includes a machine, a machine controller, and a safety controller. The machine controller is operable to identify a need for a human interaction, place the machine into a ready state for the human interaction, and generate a ready message responsive to placing the machine into the ready state. The safety controller is operable to receive the ready message, place the machine into a safe state responsive to receiving the ready message, and provide a human interaction indication responsive to placing the machine into the safe state.

25 Claims, 3 Drawing Sheets

AUTOMATION SYSTEM WITH INTEGRATED SAFE AND STANDARD CONTROL FUNCTIONALITY

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to automation control systems and, more particularly, to an automation system with integrated safe and standard control functionality.

Motion causing devices are commonly employed in a variety of environments including, for example, industrial facilities and construction environments. Such devices generally include a variety of different devices including, for example, motors and heating devices. There are circumstances in which such devices must be reliably disabled so as not to pose risks to human beings or other devices.

For example, motors often rotate at high speeds and/or provide significant torques that in certain situations could pose risks to human beings or other devices that come into contact with the motors themselves or with other devices coupled to those motors. In particular, when such motors or devices coupled to those motors are replaced, fixed, modified, tested or otherwise operated upon by human beings such as operators, engineers, or service technicians, it is desirable that the motors be reliably disabled such that the motors cease to rotate or deliver sustained torque.

In view of the possible hazards associated with automation equipment generally, many modern industrial and other facilities employ various electronic and other technologies that reduce the risk of accidents and enhance overall system safety. Additionally, standards have been developed with a goal of further reducing the risk of accidents. For example, with respect to industrial facilities, standards from organizations such as the ANSI, NFPA, ISO, CEN, CENELEC, and the IEC have been developed to establish requirements for safety. The technologies used to enhance system safety often are designed to comply with, or to assist in making a facility compliant with, standards from one or more of these organizations. Traditional safety system design has regarded the safety system as being separate from the machine control function. The safety system typically acts on its own with very little coordination with the standard control system.

In some situations frequent interactions between machinery and operators are expected. For example, a machine often performs one or more tasks on a single workpiece during a machine cycle. After the operation is complete, the workpiece is removed and a new workpiece is loaded into the machine. Operator intervention may be required to exchange the workpieces or position the new workpiece for processing. In other instances human interaction with the machine is less frequent and may occur during maintenance activities or commissioning. Regardless of the frequency of interaction, it is important that the machine control system provide for the safety of the workforce during both foreseen and unforeseen interactions. As machinery design advances and designers strive to complement human capabilities (e.g., flexibility, intelligent decision making) with those of machinery (e.g., strength, repeatability, tirelessness), these interactions become increasingly complex.

The operator load or unload function is an important interaction in that the frequency of exposure to potential hazards is high. This load operation may expose an operator to hazards at a frequency of greater than once per minute. Traditional control practice involves the standard control system placing the machine into the proper position or state of readiness for the operator load operation. The standard control system then prompts the operator to enter the hazardous area of the machine that is guarded by a light screen, floor mat or other safety sensing technology by turning on an indicator light or similar means of indicating the state of readiness of the machine. Although the machine has reached the proper state or position within its cycle, it has not yet achieved a state of safety readiness, because the operator has not yet broken the safety light curtain, floor mat or other safety protection device.

The act of the operator breaking the safety protection device puts the machine into a safe state by triggering the safety system. For instance, a typical safety system may include independent contactors that operate to isolate a motor or other machine from its source of power or drive signals. Other safety systems may interface with a motor drive to electrically disable the line drivers that generate the drive signals. Because the safety system is not triggered until after the safety protection device is activated, it is possible that the machine may not be placed in a safe state prior to the operator entering the hazardous area.

Therefore, it would be advantageous if a safety system could be integrated into the function of the overall control system to place the machine in the proper condition for the interaction (i.e., proper state or position) and be safety disabled before the operator is even prompted to enter the hazardous area.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

BRIEF SUMMARY OF THE INVENTION

One aspect of the present invention is seen in an industrial control system including a machine, a machine controller, and a safety controller. The machine controller is operable to identify a need for a human interaction, place the machine into a ready state for the human interaction, and generate a ready message responsive to placing the machine into the ready state. The safety controller is operable to receive the ready message, place the machine into a safe state responsive to receiving the ready message, and provide a human interaction indication responsive to placing the machine into the safe state.

Another aspect of the present invention is seen in a method for controlling a human interaction with a machine. A need for a human interaction is identified. The machine is placed into a ready state for the human interaction. A ready message is generated responsive to placing the machine into the ready state. The machine is placed into a safe state responsive to receiving the ready message. A human interaction indication is provided responsive to placing the machine into the safe state.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
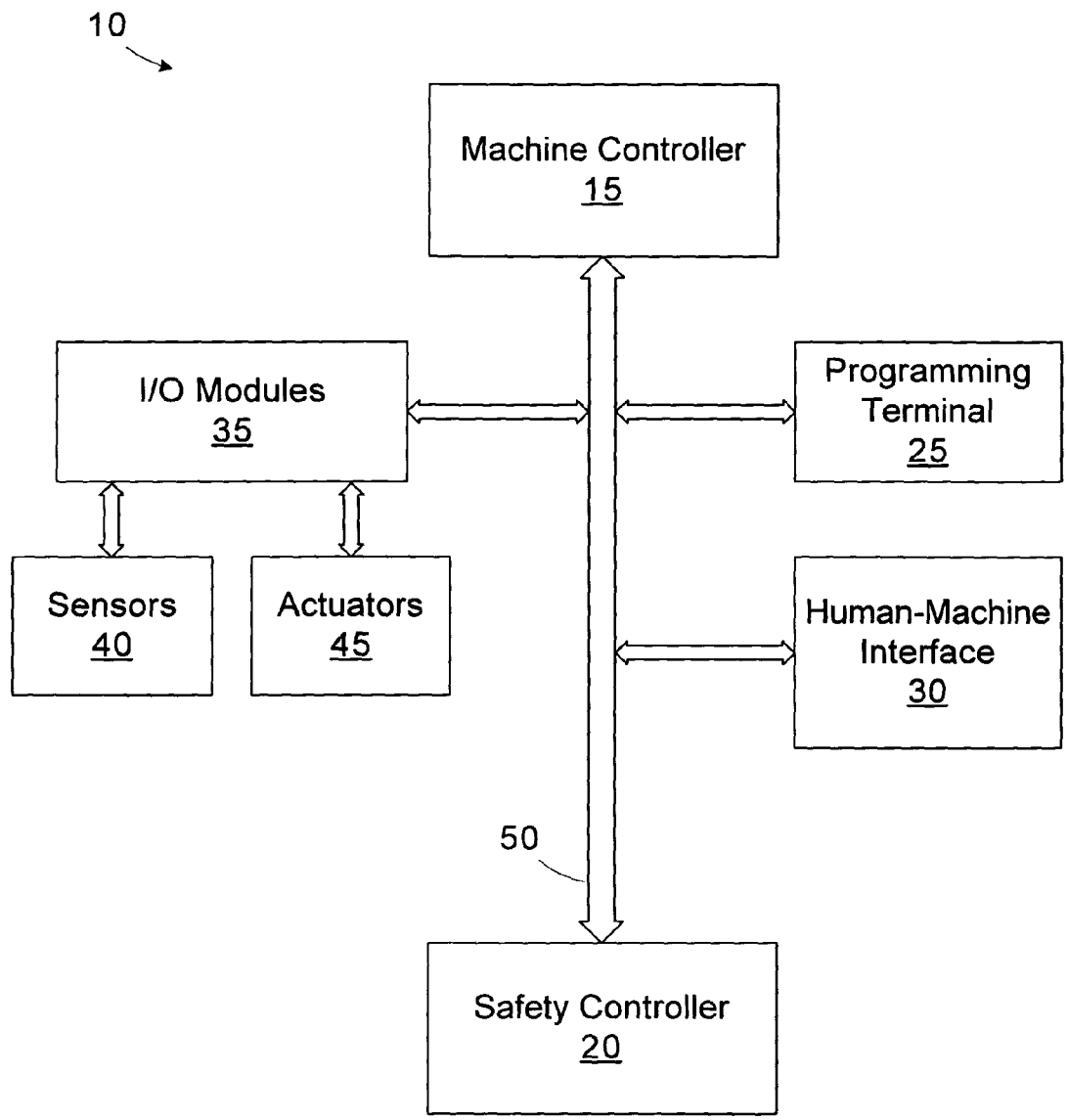
FIG. 1 is a simplified block diagram of a motor control system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Referring now to the drawings wherein like reference numbers correspond to similar components throughout the several views and, specifically, referring to FIG. 1, the present invention shall be described in the context of an industrial control system 10. Generally, the industrial control system 10 includes a machine controller 15 (e.g., programmable logic controller (PLC)), a safety controller 20, a programming terminal 25, a human-machine interface (HMI) 30, an I/O module 35, sensors 40, actuators 45, and a communication medium 50.

The programming terminal 25 allows the configuring, modifying, debugging and maintaining of the industrial control system 10. The HMI 30 provides an operator interface for operating the industrial control system 10 to perform an automated industrial process. The I/O module 35 provides an interface to the sensors 40 and actuators 45. The sensors 40 can sense items such as temperature, pressure, flow rate of a fluid, torque, electrical current, etc. The actuators 45 control items such as motors, valves, etc. associated with robotic systems, fans, beaters, pumps, and the like, any of which may represent a hazard. For example, one type of actuator 45 is a motor drive operable to generate variable frequency drive signals for driving an associated motor.

In general the machine controller 15 and the safety controller 20 may be implemented using general purpose or specialized independently functioning computing devices, such as microprocessors, which may have internal or external static or dynamic memory for storing variables and/or program instructions (e.g., software or firmware) for controlling the functioning thereof. In some embodiments, the machine controller 15 and the safety controller 20 may be integrated into a single processing unit with independence and redundancy provided through software controls.

The communication medium 50 may take the form of a cable, and may be discrete wiring or comprised of a digital network which may also include repeaters, routers, bridges, and gateways. Suitable communication media 50 are the DeviceNet™, Ethernet/IP™, or ControlNet™ networks offered by Rockwell Automation, Inc., of Milwaukee, Wis.

In general, the machine controller 15 and safety controller 20 cooperate to provide interlocking between the standard control and safety functionalities. This methodology establishes that the controlled machinery or process has already achieved the appropriate safe state and that no faults are present that could compromise the safety function, quality function, or productivity before the operator (i.e., or other individual) is prompted by the system to enter a hazardous area. Additionally this methodology ensures higher machine productivity, availability, and life as the coordinated (safe-standard) shutdown and re-start of the equipment described herein results in reduced wear-and-tear and longer equipment life. This approach represents a systematic and integrated view of the control system, including both the standard and safety functions.

Figure 2:
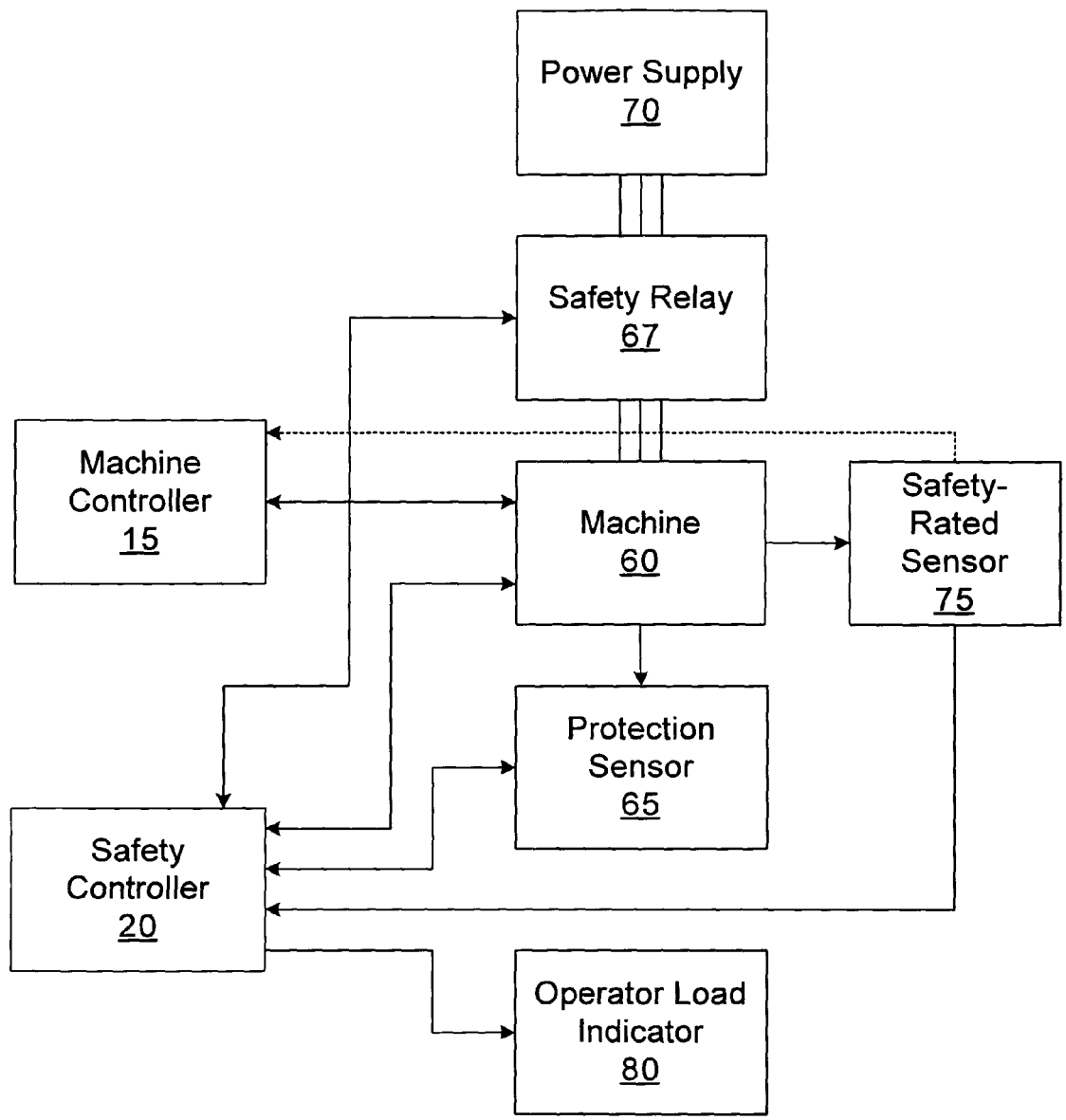
FIG. 2 is a simplified circuit diagram of the machine controller and safety controller of FIG. 1 interfacing with a machine.

Turning now to FIG. 2, a simplified block diagram of the machine controller 15 and safety controller 20 interfacing with a machine 60 is provided. For ease of illustration, the network elements shown in FIG. 1 have been omitted, and the controllers 15, 20 are shown as interfacing directly with the machine 60. In an actual implementation, devices, such as communication modules, I/O modules, bridges, etc. may be disposed between the controllers 15, 20 and the machine 60. In one example, the machine 60 is a motor drive and associated motor. The machine controller 15 provides control signals to the motor drive, such as a position or speed signal, and the motor drive generates drive signals for the motor in response to the control signals, as is well known in the art. In another example, the machine 60 may be more complex, such as a robotic system having multiple drives and sensors indicating the position of the robotic elements.

The safety controller 20 may interface with the machine 60 in various ways to place the motor in a safe state when appropriate (i.e., when an operator is interfacing with the machine 60 to load or position workpieces to be operated on, or when any other human interaction is required). A protection sensor 65 (e.g., light screen, floor mat, or the like) may be provided for detecting the presence of an individual in a region of the machine 60 monitored by the safety controller 20. In response to an activation of the protection sensor 65, the safety controller 20 may take actions to place the machine 60 into a safe state. For example, a safety relay 67 (optional) may be provided for isolating the machine 60 from a power supply 70. When the safety controller 20 identifies an activation of the protection sensor 65, it may open the safety relay 67 to isolate the machine 60, thereby preventing its operation. In addition to a power supply 70, the safety controller 20 may also isolate the machine from other energy sources that may give rise to a hazard, such as, but not limited to, an electrical energy source, a mechanical energy source, a pneumatic source, a hydraulic source, a radiation source, a pressure source, a chemical source, a thermal energy source, and the like.

The safety controller 20 may also interface with the machine 60 to verify a position of the machine with enhanced certainty using a safety-rated sensor 75. A safety-rated sensor 75 may include a position switch or limit switch that verifies a physical position of the machine 60. The safety-rated sensor 75 may have multiple channels through which to communicate with the safety controller 20 to guard against a single failure from causing it to provide false information. In some cases, the output of the safety-rated sensor 75 may also be used by the machine controller 15 during its control of the machine 60 for normal processing (i.e., as indicated by the connection between the safety-rated sensor 75 and the machine controller 15 shown in phantom), but in other situations, the machine controller 15 may use a different technique. For example, it is common for a position feedback sensor to be provided on a motor shaft that provides a stream of pulses responsive to rotations of the shaft. The machine controller 15 may use pulse counts, or some other measure, such as run time, to determine a derived position as opposed to an actual physical position. In such cases, the machine controller 15 may think that the machine 60 is in a particular position based on the pulse counts or run time, but there may be an error in the counts. The safety-rated sensor 75 may use an actual physical sensor (e.g., limit switch, optical sensor, etc.) to verify that the machine 60 is actually in the position contemplated by the machine controller 15.

Still referring to FIG. 2, an operator load indicator 80 may be provided on the machine 60 to signal an operator that a load operation is required and that the operator should enter the area protected by the protection sensor 65. As will be described below, the machine controller 15 and safety controller 20 cooperate to ensure that the machine 60 is in a safety-disabled state prior to prompting the operator to enter the hazardous loading area. The operator load indicator 80 may also be used as a signaling mechanism for other human interactions, such as maintenance, testing, etc.

The previous examples of parameters used for machine control and additional parameters incorporated into safety control are provided merely for illustrative purposes. The actual implementation will employ a method that meets the target safety level based on the risk assessment, which would typically include fault tolerance and fault detection.

Figure 3:
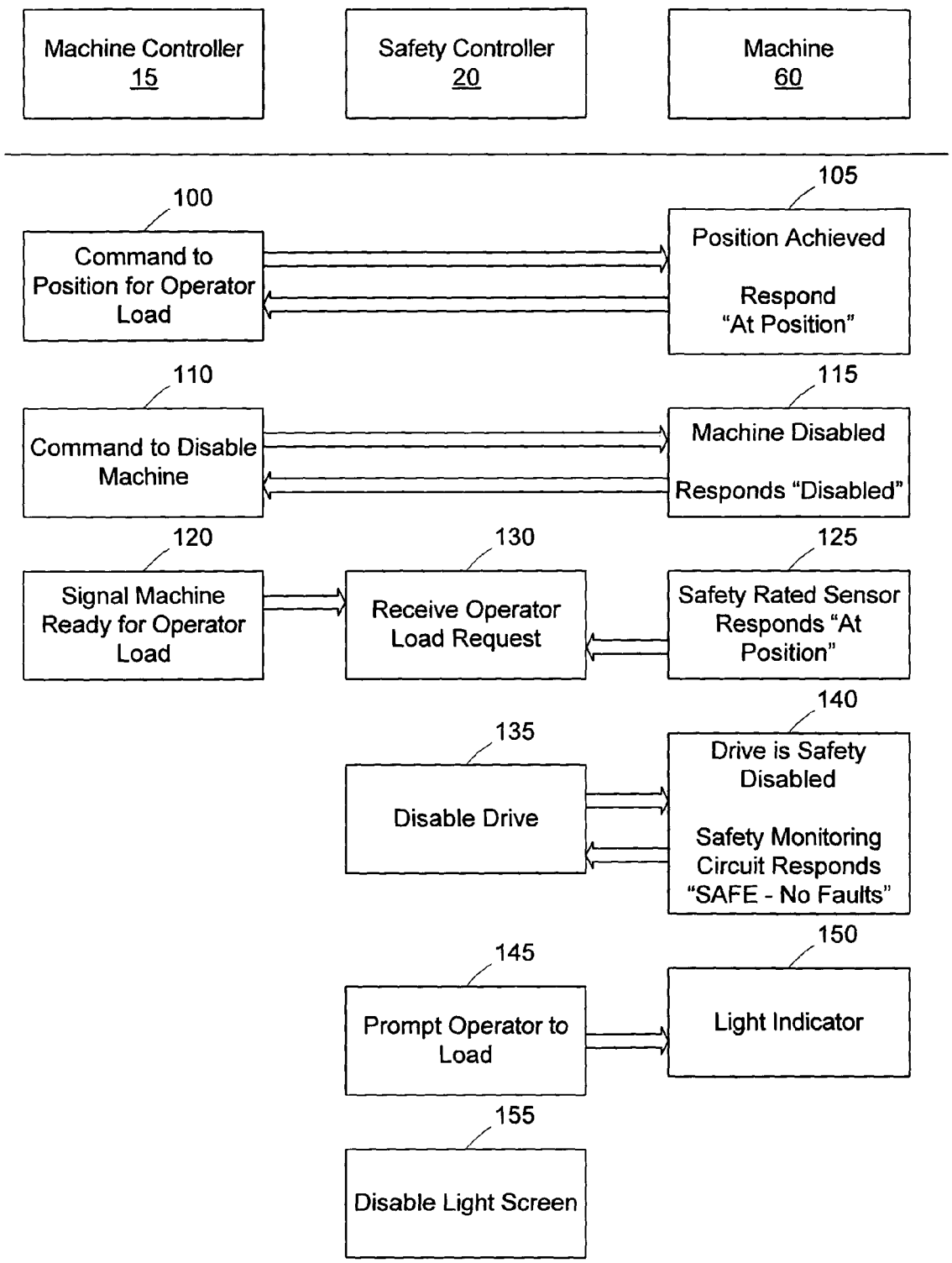
FIG. 3 is a diagram illustrating a handshaking procedure performed by the machine controller, safety controller, and machine of FIG. 2.

Referring now to FIG. 3, a diagram illustrating a handshaking procedure performed by the machine controller 15, safety controller 20, and machine 60 of FIG. 2. For purposes of this illustration, the machine 60 is described as a motor controlled by a variable frequency drive (VFD). An illustrative safety system for interfacing with a drive and monitoring its safety status is described in U.S. patent application Ser. No. 11/134, 174, entitled "Independent Safety Processor for Disabling the Operation of High Power Devices," assigned to the assignee of the present invention, and incorporated herein by reference in its entirety.

As seen in FIG. 3, the machine controller 15 reaches a point in its control program where an operator load is required, and issues a command to the machine 60 to travel to a load position in block 100. In block 105, the machine 60 achieves the load position and responds with an "at position" message. The machine 60 may determine its position in a variety of ways, such as by timing information, encoder pulse count information, sensor information, etc. However, depending on the nature of the "at position" sensor, the actual position may not be a reliable signal from a safety standpoint. For example, if a sensor susceptible to a single failure is used, the "at position" indication may be in error.

After receiving the "at position" signal from the machine 60 in block 105, the machine controller 15 disables the machine 60 in block 110 in accordance with its standard shutdown sequence, and the machine 60 responds that it is disabled in block 115. In the example of a VFD, the machine controller 15 may issue a "stop" command to the drive, causing it to remove drive signals from its associated motor. The drive may respond that the motor drive signals have been removed. At this point in the sequence the machine 60 is not yet in a safety disabled state.

In block 120, the machine controller 15 informs the safety controller 20 that the machine 60 is ready for an operator load. In some embodiments, a safety-rated sensor 75 is employed to generate a safety-rated "at position" signal in block 125. As described above, the safety-rated sensor 75 typically employs a dual channel signal and/or potentially other means to guard against a single failure from providing errant results. For example in a robotic system, the machine 60 may count pulses to determine the position of a turntable on which a workpiece is to be loaded by an operator. The turntable may include a guard that shields the operator from other parts of the robotic system that continue to operate during the operator load sequence. The safety-rated sensor 75 may be a limit switch or optical sensor that verifies the actual position of the turntable to provide the safety-rated "at position" signal, as opposed to the derived position used by the machine controller 15.

The safety controller 20 receives the operator load request and the safety-rated "at position" signal in block 130 and disables the machine 60 using the safety-system in block 135. For example, in the safety system for a motor drive, as described in the above-referenced patent application, the motor drive is safety disabled by removing an enable signal from the line drivers used to provide the high power drive signals to the motor and also by removing a voltage source to the line drivers and associated pull-up resistors. This dual disabling function provides additional certainty that the drive is disabled, as compared to the standard response of the motor drive to a "stop" signal, which is to command the line drivers to a zero level. The safety system monitors the enable signals and voltages provided to the line drivers to verify that no faults exist. Hence, in block 140, the safety controller 20 is sent an acknowledgement that the machine 60 is safety disabled and that no safety faults are identified.

Some embodiments, may not employ a separate safety-rated sensor 75 to verify the "at position" signal prior to safety disabling the machine. In some cases, the sensor used by the machine 60 to determine the "at position" status may be safety rated. In other applications, the safety system may verify that the machine 60 is safety disabled without requiring an additional position signal. For example, if the machine is a motor that is not required to be in a particular position to be disabled, but rather just requires that the motor be prevented from rotating, a safety-rated sensor 75 would not be used. In these cases, block 125 would be eliminated, and the safety controller 20 would initiate a safety-disable in block 135 after receiving the operator load request in block 130.

After the machine 60 is disabled in block 130 and the safety systems does not register any faults in block 140, the safety controller prompts the operator to load the machine in block 145 and sends a signal to the machine 60 to light the operator load indicator 80 in block 150. Because the safety controller 20 has verified that the machine 60 is in a safe state prior to prompting the operator to enter, the protection sensor 65 is redundant and may be disabled in block 155. If the protection sensor 65 were not disabled, the safety controller 20 would normally initiate a safety shutdown responsive to the protection sensor 65 being activated, but since a safety shutdown has already occurred prior to lighting the load indicator 80, this interaction is not necessary.

The cooperative safety shutdown implemented by the machine controller 15 and safety controller 20, as described in reference to FIG. 3, may be contrasted with a conventional control scheme by evaluating the events that would occur if the machine had not been put in a safe condition by the machine controller 15 during its disabling in blocks 110, and 115. In accordance with the present invention, the operator is not prompted to enter the area until the safety shutdown state is verified with no faults.

In a conventional protection scheme the machine controller 15 would light the load indicator 80 in block 120. Upon activation of the protection sensor 65, the safety controller 20 would execute a safety shutdown. In the example discussed briefly above, where the machine 60 includes a turntable with a guard, the turntable could be in an errant position with the guard not blocking off other operating portions of the robotic cell from the operator. Hence, when the operator entered the hazardous area and triggered the protection sensor 65, the safety controller 20 would identify the fault and initiate a shutdown of not only the turntable where the operator load is to take place, but also the entire cell to protect the operator from the other operating portions.

In accordance with the present invention, the operator would not have been signaled in block 145 to enter because the safety position would not have been verified in blocks 130 or 140. Hence, the safety controller 20 would send an error message to the machine controller 15 in block 135 to correct the problem, thereby avoiding a safety shutdown of the entire cell. Moreover, the operator would not have been exposed to the hazard of the exposed machinery resulting from the errant turntable and guard position.

The interlocks between the machine controller 15 and safety controller 20 provide an opportunity to ensure that the "At Position" safety-rated sensor 75 is changing state in a manor expected by the control system issuing the motion or sequencing commands. This monitoring may occur outside of the operator load sequence during the remaining machine cycle, thereby providing a testing interval for the "At Position" or other safety related sensors within the system to ensure that the sensors are operating correctly during the rest of the cycle thus providing high confidence that the overall safety function will be available should a demand be placed on the safety system in an unexpected circumstance. This interlocking allows the safety system to establish appropriate anti-repeat, anti-tiedown, safety test intervals, and/or other protections that are components of a robust safety implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. An industrial control system, comprising:
a machine having a restricted access portion presenting a danger to a human operator in the restricted access portion;
a machine controller executing a stored control program to:
a) identify a need for a human operator to be in the restricted access portion wherein the need is based on a planned machine-operator interaction indicated by a point in the control program and not based on detection of a human presence or on an operator input,
b) place the machine into a ready state in response to the identification of the need for the operator to be in the restricted access portion by suspending operation of the machine through machine control, and
c) upon the control program placing the machine into the ready state, generate a ready message signaling that the control program has identified the machine is in the ready state;
a protection sensor providing a safety signal, wherein the safety signal implements fault tolerance or fault detection according to the target safety level of the control system, indicating the presence of a human in the restricted access portion; and
a safety controller, wherein the machine controller and the safety controller are independently functioning computing devices with separate memory for storing variables and programs and each controller independently executes its respective program, the safety controller executing a stored program to:
a) receive the ready message from the machine,
b) receive the safety signal indicating the presence of the human operator in the restricted access portion from the protection sensor,
c) after receiving either one of the ready message or the safety signal, initiate placing the machine into a safe state, wherein the safe state suspends operation of at least the restricted portion of the machine by interrupting power to at least the restricted portion of the machine,
d) verify that the machine has been placed in the safe state with no fault conditions, and
e) if the machine has been placed in the safe state with no fault conditions, provide a human interaction indication sensible by a human that indicates that the machine is ready for human interaction with the restricted access portion in response to receiving the ready message and placing the machine into a safe state;
whereby the machine is placed in the safe state before the human operator moves into the restricted access portion.

2. The system of claim 1, wherein the machine controller is operable to place the machine into the ready state by instructing the machine to achieve a ready position.

3. The system of claim 2, wherein the machine is operable to generate an at position message responsive to achieving the ready position.

4. The system of claim 3, wherein the machine controller is operable to disable the machine responsive to receiving the at position message.

5. The system of claim 4, wherein the machine controller is operable to generate the ready message responsive to disabling the machine.

6. The system of claim 2, further comprising a safety-rated sensor operable to generate a safety-rated at position signal responsive to determining the machine is in the ready position, wherein the safety controller is operable to place the machine into the safe state responsive to receiving the safety-rated at position signal.

7. The system of claim 6, wherein the safety controller is operable to inhibit the human interaction indication responsive to the safety-rated sensor not generating the safety-rated at position signal.

8. The system of claim 1, wherein the machine controller is operable to place the machine into the ready state by disabling the machine.

9. The system of claim 1, wherein the safety controller is operable to inhibit the human interaction indication responsive to identifying a fault condition.

10. The system of claim 1, wherein the machine controller and the safety controller are integrated into a single unit.

11. The system of claim 1, further comprising an energy source coupled to the machine, wherein the safety controller is operable to isolate the machine from the energy source to place the machine in the safe state.

12. The system of claim 1, wherein the machine includes a drive unit operable to provide drive signals for the machine and the safety controller is operable to inhibit the drive unit from generating the drive signals to place the machine in the safe state.

13. The system of claim 1, further comprising a protection sensor operable to detect the presence of an operator in a protected region associated with the machine, wherein the safety controller is operable to disable the protection sensor after placing the machine into the safe state.

14. A method for controlling a human interaction with a machine, comprising:
- in a machine controller, executing a stored control program, identifying a need for a human to be within a restricted access portion of the machine during normal machine operation wherein the need is based on a planned machine-operator interaction indicated by a point in the control program and not based on detection of a human presence or on an operator input;
- placing the machine into a ready state for the human interaction in response to the identification of the need for the operator to be in the restricted access portion by temporarily suspending normal machine operation through machine control signals from the machine controller;
- generating a ready message in the machine controller responsive to the control program placing the machine into the ready state signaling that the control program has identified the machine is in the ready state;
- transmitting the ready message to a safety controller, wherein the machine controller and the safety controller are independently functioning computing devices with separate memory for storing variables and programs and each controller independently executes its respective program;
- placing the machine into a safe state using the safety controller responsive to receiving the ready message or a safety signal from a protection sensor indicating the presence of the human operator in the restricted access portion, wherein the safe state suspends operation of at least the restricted access portion of the machine by interrupting power to at least the restricted access portion of the machine and wherein the safety signal implements fault tolerance or fault detection according to the target safety level of the control system;
- verifying that the machine is in the safe state with no fault conditions; and
- providing a human interaction indication sensible by a human from the safety controller indicating the machine is ready for human interaction with the restricted access portion responsive to placing the machine into the safe state and receiving the ready message.

15. The method of claim 14, wherein placing the machine into the ready state further comprises instructing the machine to achieve a ready position.

16. The method of claim 15, further comprising generating an at position message responsive to achieving the ready position.

17. The method of claim 16, wherein placing the machine into the ready state further comprises disabling the machine responsive to receiving the at position message.

18. The method of claim 17, further comprising generating the ready message responsive to disabling the machine.

19. The method of claim 15, further comprising:
- generating a safety-rated at position signal responsive to determining the machine is in the ready position using a safety-rated sensor; and
- placing the machine into the safe state responsive to receiving the safety-rated at position signal.

20. The method of claim 19, further comprising inhibiting the human interaction indication responsive to not receiving the safety-rated at position signal.

21. The method of claim 14, wherein placing the machine into the ready state further comprises disabling the machine.

22. The method of claim 14, further comprising inhibiting the human interaction indication responsive to identifying a fault condition.

23. The method of claim 14, further comprising isolating the machine from an energy source to place the machine in the safe state.

24. The method of claim 14, wherein the machine includes a drive unit operable to provide drive signals for the machine, and placing the machine in the safe state further comprises inhibiting the drive unit from generating the drive signals.

25. The method of claim 14, further comprising disabling a protection sensor operable to detect the presence of an operator in a protected region associated with the machine after placing the machine into the safe state.

* * * * *